United States Patent
Ma et al.

(10) Patent No.: US 11,341,132 B2
(45) Date of Patent: May 24, 2022

(54) GENERATING A PRODUCER-DRIVEN EXECUTION PLAN FROM A CONSUMER-DRIVEN ITERATOR-BASED EXECUTION PLAN

(71) Applicant: SYBASE, INC, Dublin, CA (US)

(72) Inventors: Xiaobin Ma, Fremont, CA (US); Xun Cheng, Dublin, CA (US); Prabhas Kumar Samanta, Kolkata (IN)

(73) Assignee: SYBASE, INC., Dublin, CA (US)

( * ) Notice: Subject to any disclaimer, the term of this patent is extended or adjusted under 35 U.S.C. 154(b) by 1855 days.

(21) Appl. No.: 14/841,713

(22) Filed: Sep. 1, 2015

(65) Prior Publication Data
US 2017/0060948 A1 Mar. 2, 2017

(51) Int. Cl.
*G06F 16/00* (2019.01)
*G06F 16/2453* (2019.01)
*G06F 16/22* (2019.01)

(52) U.S. Cl.
CPC .... *G06F 16/24542* (2019.01); *G06F 16/2246* (2019.01)

(58) Field of Classification Search
CPC ......... G06F 17/30463; G06F 17/30327; G06F 16/24542; G06F 16/2246
USPC ........................................................ 707/718
See application file for complete search history.

(56) References Cited

U.S. PATENT DOCUMENTS

| | | | | |
|---|---|---|---|---|
| 8,954,418 B2 * | 2/2015 | Faerber | ............... | G06F 16/2433 707/718 |
| 9,026,525 B2 * | 5/2015 | Harren | .............. | G06F 16/24542 707/718 |
| 2004/0186840 A1 * | 9/2004 | Dettinger | ............ | G06F 16/2423 |
| 2004/0220923 A1 * | 11/2004 | Nica | ................. | G06F 16/24542 707/718 |
| 2005/0222975 A1 * | 10/2005 | Nayak | ................... | G06F 16/338 707/707 |
| 2008/0120283 A1 * | 5/2008 | Liu | ........................ | G06F 16/83 707/E17.127 |
| 2009/0327214 A1 * | 12/2009 | Richardson | ....... | G06F 16/24545 707/707 |
| 2011/0029508 A1 * | 2/2011 | Al-Omari | ......... | G06F 16/24542 707/718 |
| 2014/0157247 A1 * | 6/2014 | Chang | ................... | G06F 8/4441 717/146 |
| 2015/0120699 A1 * | 4/2015 | Faerber | ............. | G06F 16/24542 707/718 |
| 2015/0379077 A1 * | 12/2015 | Grosse | ............. | G06F 16/24542 707/718 |
| 2016/0306847 A1 * | 10/2016 | Ding | ....................... | G06F 8/443 |

OTHER PUBLICATIONS

Goetz Graefe; Volcano—An Extensible and Parallel Query Evaluation System; Feb. 1994; p. 120-135; vol. 6; Issue 1; IEEE Transactions on Knowledge and Data Engineering; NJ; USA; http://paperhub.s3.amazonaws.com/dace52a42c07f7f8348b08dc2b186061.pdf.

* cited by examiner

*Primary Examiner* — Alexandria Y Bromell
(74) *Attorney, Agent, or Firm* — Buckley, Maschoff & Talwalkar LLC

(57) ABSTRACT

An original query execution plan of a database query is received. The original query execution plan represents a tree of operators. Source code for the original query execution plan is generated by a single traversal of the tree of operators. The generated source code is compiled into native machine code. The native machine code represents a simplified native access plan (SNAP).

20 Claims, 7 Drawing Sheets

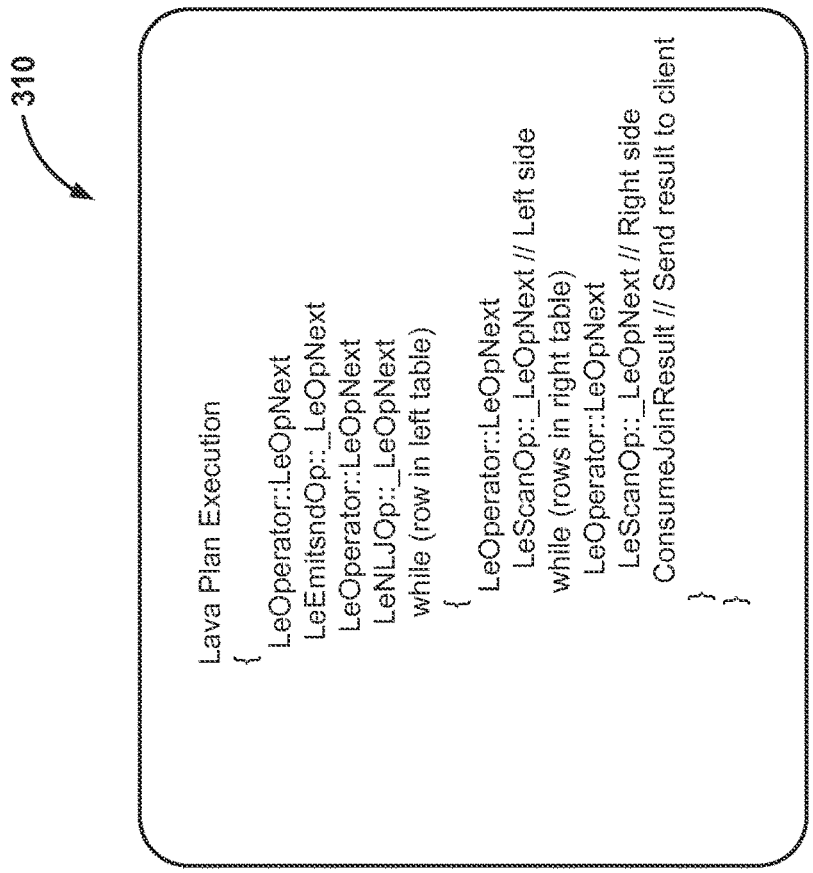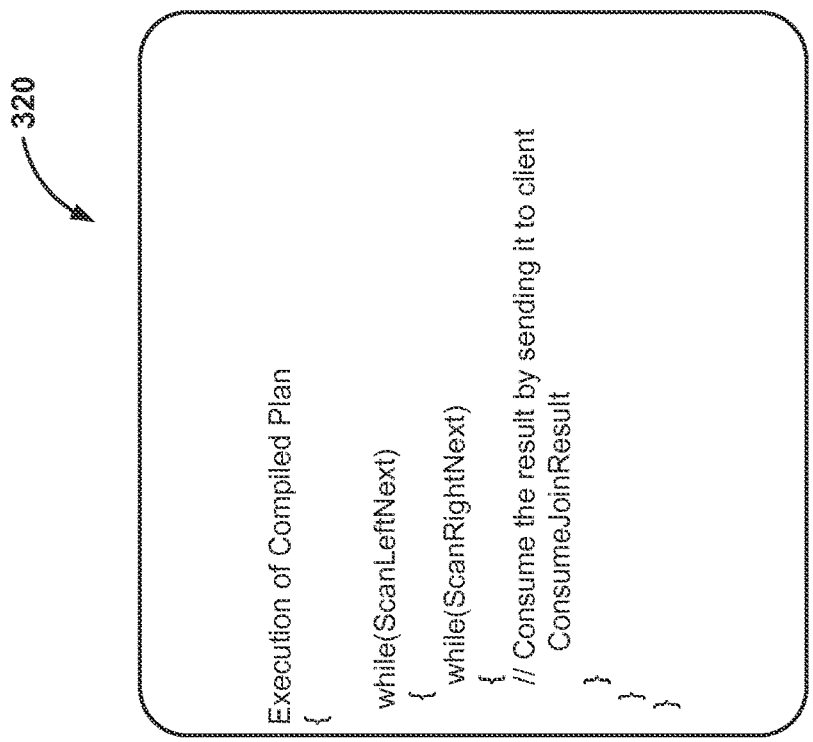
FIG. 3

GENERATING A PRODUCER-DRIVEN EXECUTION PLAN FROM A CONSUMER-DRIVEN ITERATOR-BASED EXECUTION PLAN

BACKGROUND

Most database systems translate a given query into an expression in a (physical) algebra, and then starting evaluating this algebraic expression to produce the query result. The classical model to execute and process these algebraic expressions is iterator-based. For example, the current commercial database management systems (DBMS) are commonly based on the execution model designed in the extensible query execution engine known as Volcano. According to the Volcano execution model, basic operations of the query execution are implemented as self-contained operators and query execution plans are trees built from a basic set of operators, such as a scan operator for reading rows from a table, or a merge join operator for joining the rows from two scan operators. Importantly, in Volcano model all operators are implemented as iterators that support open-next-close protocol. Every operator produces a tuple stream from its input, and allows for iterating over this tuple stream by repeatedly calling the next function of the operator.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 3 illustrates an example of a first execution flow of an original query execution plan and execution flow of the SNAP, which is generated based on the original query execution plan, according to one embodiment.

DETAILED DESCRIPTION

Figure 1:
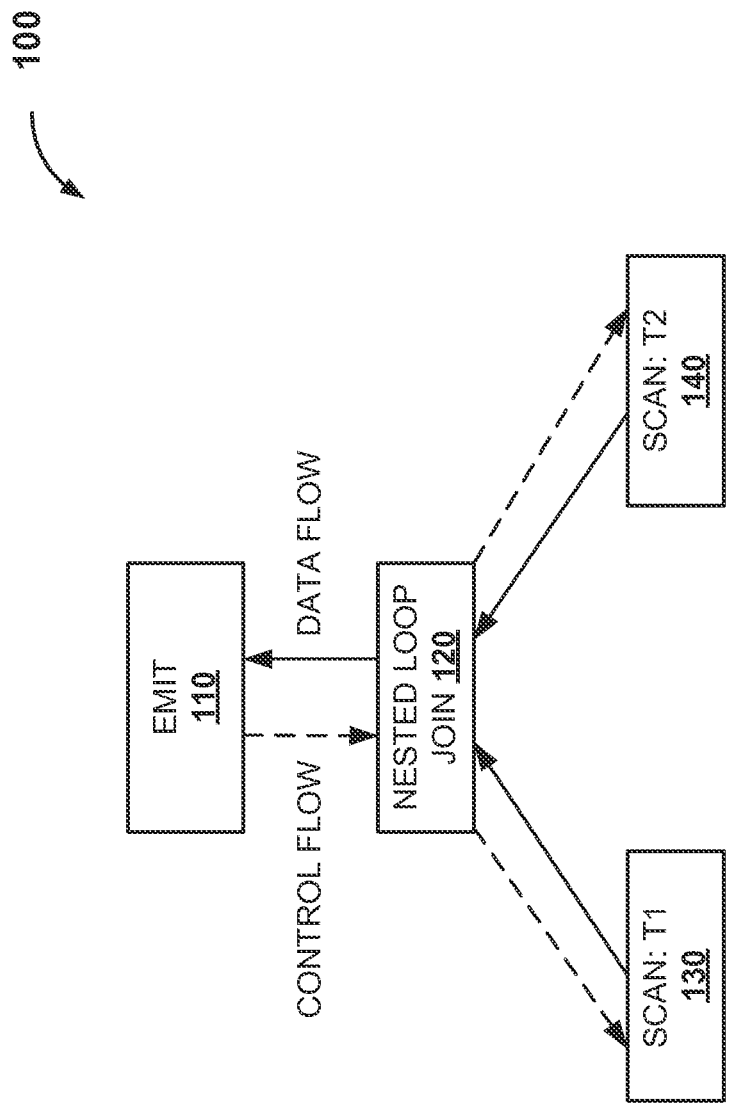
FIG. 1 illustrates an exemplary query execution plan.

Embodiments of techniques for database schema management of micro service applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step when the first step is completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B." As another example, "A or B" may mean at least the following: "only A", "only B", "both A and B", "at least both A and B." When an exclusive-or is intended, such will be specifically noted (e.g., "either A or B", "at most one of A and B").

In this document, various computer-implemented methods, processes and procedures are described. It is to be understood that the various actions (receiving, retrieving, determining, generating etc.) are performed by a hardware device, even if the action may be authorized, initiated or triggered by a user, or even if the hardware device is controlled by a computer program, software, firmware, and the like. Further, it is to be understood that the hardware device is operating on data, even if the data may represent concepts or real-world objects, thus the explicit labeling as "data" as such is omitted. For example, when the hardware device is described as "storing a document", it is to be understood that the hardware device is storing data that represents the document.

An example of a current commercial database system that is based on the Volcano's iterator-based query execution model is Adaptive Server Enterprise (ASE), provided by Sybase, Inc., a subsidiary of SAP SE. Other examples of modern database systems based on the Volcano model include, but are not limited to Oracle, MS SQL Server, MySql, Postgre SQL, etc. The ASE Lava execution engine, implemented by using an object-oriented design, is based upon the classic Volcano execution model. In Lava query execution plan, each operator encapsulates their own functionality and implements the same application programming interface (API), consisting of five methods: acquire, open, next, close and release. Normally acquire and release operators are called once to acquire the resources needed for the query execution at the beginning of the execution and release the acquired resources at the end of the execution. Calling open for the top-most operator results in initializations of all the operators in the query plan and close will clean up the execution of the query plan. The next operator is used to iterate over the results of any operation. With this model, an operator does not depend on what operator produces its input and what operator consumes its output.

FIG. 1 illustrates an exemplary query execution plan 100. Query execution plan illustrates an exemplary Volcano operator tree for the following query select*from T1, T2 where T1.*a*=T2.*b*

When the query execution plan 100 is executed the emit operator 110 calls upon its child operator to return a qualifying row. For example, the emit operator 110 calls upon the nested loop join operator 120. Then, the nested loop join operator 120 calls upon one or both of its child operators to get rows from tables T1 and T2 and does the necessary processing to find a qualifying row. The nested loop join operator 120 may call upon either of its child operators many times (each time the child operator will return a single row) until it finally finds a qualifying row. Once a row qualifies, nested loop join 120 passes it back to emit operator 110, which sends it to a client system requesting the query results. All of the operators maintain their own state information, so that when emit operator 110 is called upon to send the next qualifying row, it calls nested loop join operator 120. Then, nested loop join operator 120 continues where it left off after the returning of the previous row. When nested loop join operator 120 calls scan operators 130 and 140 for the next row, scan operators 130 and 140 also continue the scan where they left off instead of starting again from the beginning of the table. This behavior is known as consumer-driven, because each operator explicitly calls for a row from its child operator(s) and will get exactly one row each time it calls. Consumer-driven behavior is cursor-based execution: each FETCH command returns one qualifying row and each subsequent FETCH command will return the next qualifying row. Thus, the Volcano model is suited for implementing cursors, unlike a producer-driven execution model.

Based on the Volcano model, a query execution engine is designed to processes query execution plans built of operators which represent the basic operations required to execute a query. Each operator is modeled as a self-contained software object that accepts rows from one or more data streams. The operator processes many iterations of a data stream across many nodes in serial or parallel. The operators are agnostic to the source of the data stream. For example, the source of the data stream could be a disk file, a network connection or another operator. For each row of a data stream, the operator applies a predefined behavior, according to its type (e.g., a scan or a nested loop join). A key feature of all operators is that they have the same external interface. For example, all operators open data streams, iteratively read the rows of the streams, and process the read rows of the streams and close the streams.

The consumer-driven iterator-based model is flexible and extensible and can be used to build complex query execution plans. However, consumer-driven iterator-based execution works better when the cost of input and output used to determine query performance. As main memory capability grows, query performance is determined by the raw central processing unit (CPU) costs of query processing itself. For example, for an in-memory database server, the Volcano model exhibits several drawbacks. First, the program code for a specific query execution plan may not be compact, thus increasing the CPU computation and instruction miss. Basically the execution model of current database servers is an interpreter model that is responsible to execute all query plans. Every time an execution query plan (e.g., a Lava tree) is received at the database server, the database server selects a specific code path to execution of this query execution plan, in other words, not all code or components in the database execution engine are required to execute a specific plan. These unnecessary code paths and components decrease the code locality. This may lead to more instruction miss and also potentially make the execution code path unnecessarily longer. Second, the code path from the top most emit operator to leaf nodes is long. To produce one single tuple, the next function of every operator in the code path needs to be executed. Thus, to produce all tuples, all these next functions have to be called many times. Third, when the execution engine such as Lava execution engine is implemented using an object-oriented design, open, next, and close functions are implemented as virtual functions. However, calling the virtual functions requires access to virtual tables, potentially causing more instruction and branch prediction miss and may increase CPU consumption. Thus, in the iterator-based consumer-driven Volcano model, the long execution path and the numerous function calls when producing a single tuple cause poor code locality and poor CPU resource usage. For example, poor CPU register usage may increase the possibility of instruction miss and may prevent modern compilers and CPUs from making deep CPU pipelining. In one embodiment, the consumer-driven interpreter DBMS execution model to a compact producer-driven data centric execution model.

Figure 2:
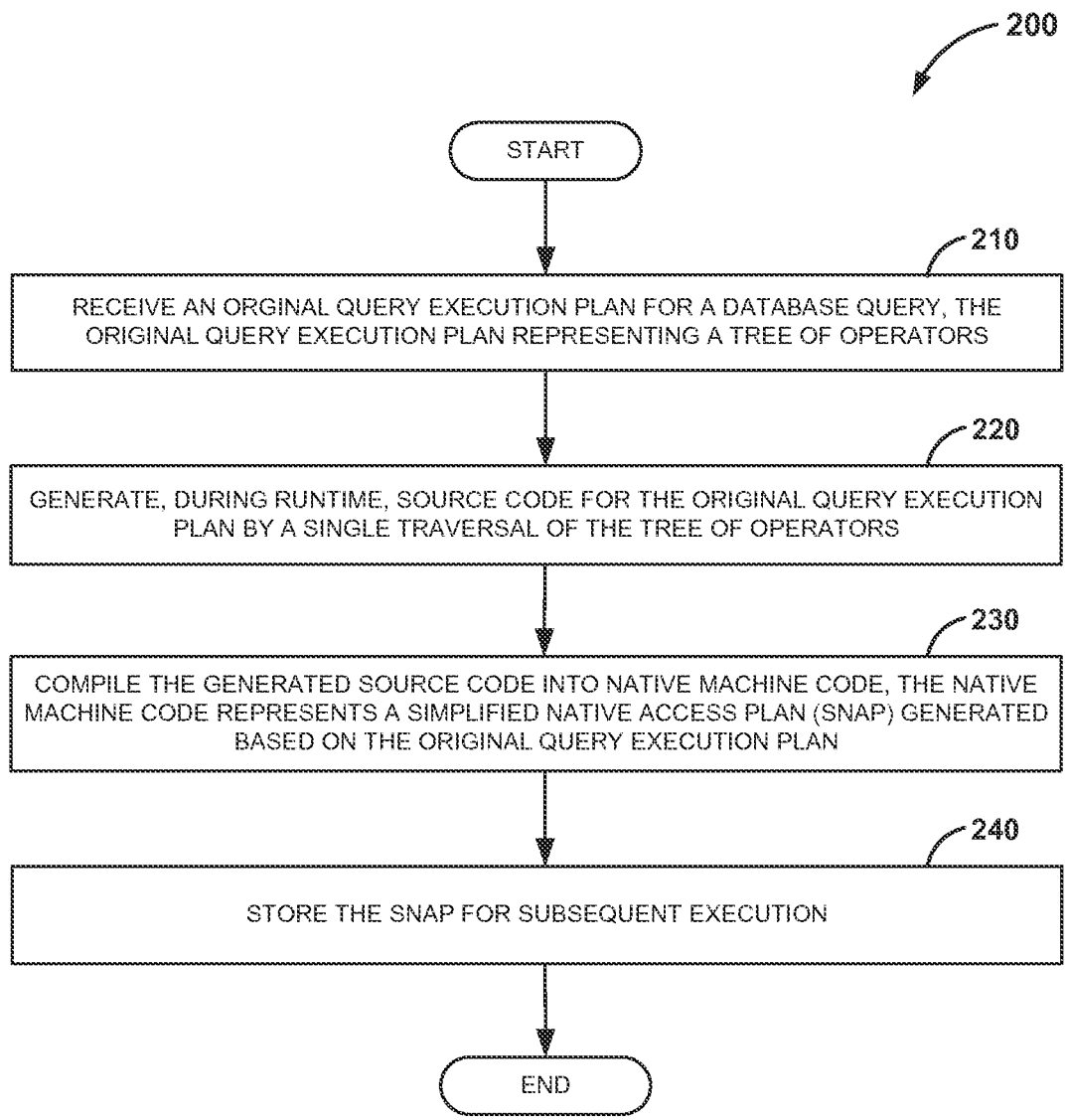
FIG. 2 illustrates a process to generate a SNAP for an original database quay plan, according to one embodiment.

In one embodiment, a simplified native access plan (SNAP) is generated for a database query to improve execution performance of the database query. FIG. 2 illustrates a process 200 to generate a SNAP for an original database query plan, according to one embodiment. At 210, an original query execution plan for a database query is received. The original query execution plan represents a tree of operators, in one embodiment, the query execution plan may be a Lava tree of operators. At 220, source code for the original database query plan is generated. In one embodiment, the source code is generated during runtime or on the fly. The source code may be generated using a low level virtual machine (LLVM) application programming interface (API) provided by the LLVM compilation framework, according to one embodiment. In such case, the generated source code is a LLVM Intermediate Representation (IR) code. The source code may be generated using any programming libraries that provide Just-in-Time compilation. For example, C/C++ JIT compiler.

In one embodiment, the source code may be generated by a single traversal of the tree of operators that represents the original query execution plan, according to a producer-driven model rather than consumer-driven model. Unlike the iterator-based consumer-driven model, in the producer-driven execution model all qualifying rows are returned once the execution engine is activated before control is returned to the client process.

Once the source code for the original query execution plan is generated, at 230, the generated source code is compiled into native machine code. The native machine code represents a SNAP. The SNAP is based on the original query execution plan. In one embodiment, the SNAP is an optimized transformation of the original query execution plan. For example, the SNAP may have shorter code path, less branch statements and better instruction and data locality when compared to the original query execution plan. In one embodiment, the SNAP may speed up execution of On-line Transaction Processing (OLTP) queries and in particular, eXtreme OLTP queries under the ASE Database Server provided by SAP SE. In one embodiment, a just-in-time (JIT) compilation phase is introduced to compile the source code for the query execution plan into the SNAP.

Thus, the execution of the generated source code is optimized during runtime. At 240, the SNAP is stored for subsequent execution. Subsequent execution of the database query will invoke the generated SNAP directly instead of the original query execution plan.

FIG. 3 illustrates an example of execution flow 310 of an original query execution plan and execution flow 320 of the SNAP, which is generated based on the original query execution plan, according to one embodiment. In particular, FIG. 3 illustrates an example of converting a nested loop join (NLJ) query from iterator-based model to a functionally equivalent single function consisting of a doubled loop. In one embodiment, execution flow 310 represents a conceptual call stack of a Lava query execution plan and the execution flow 320 represents a conceptual call stack of the converted SNAP. The "ConsumeJoinResult" of execution flow 310 is a conceptual function that otherwise is not included in the scan operator (e.g., "LeScanOp"). Instead, when an operator, such as LeScanOp or LeNLJOp, produces a row, the operator will exit its LeOpNext( ) function and return to LeOpNext( ) function of its parent operator that then consumes the row. After the whole Lava query execution plan generates a row, the consume function in LeEmitOp::_LeOpNext( ) sends the row to the client process. The execution flow 320 of the converted SNAP consists of a double loop, scan functions and a function to send a row to the client process. The function to send the row to the client process is within the double loop. In the execution flow 320, there is no virtual function call context switch. Also, there are not too many function calls (or entrances) and exits. The converted SNAP has a compact function with better code locality and allows a compiler to more effectively utilize modern CPU architecture to optimize the generated source code and build deep CPU pipelining.

Figure 4:
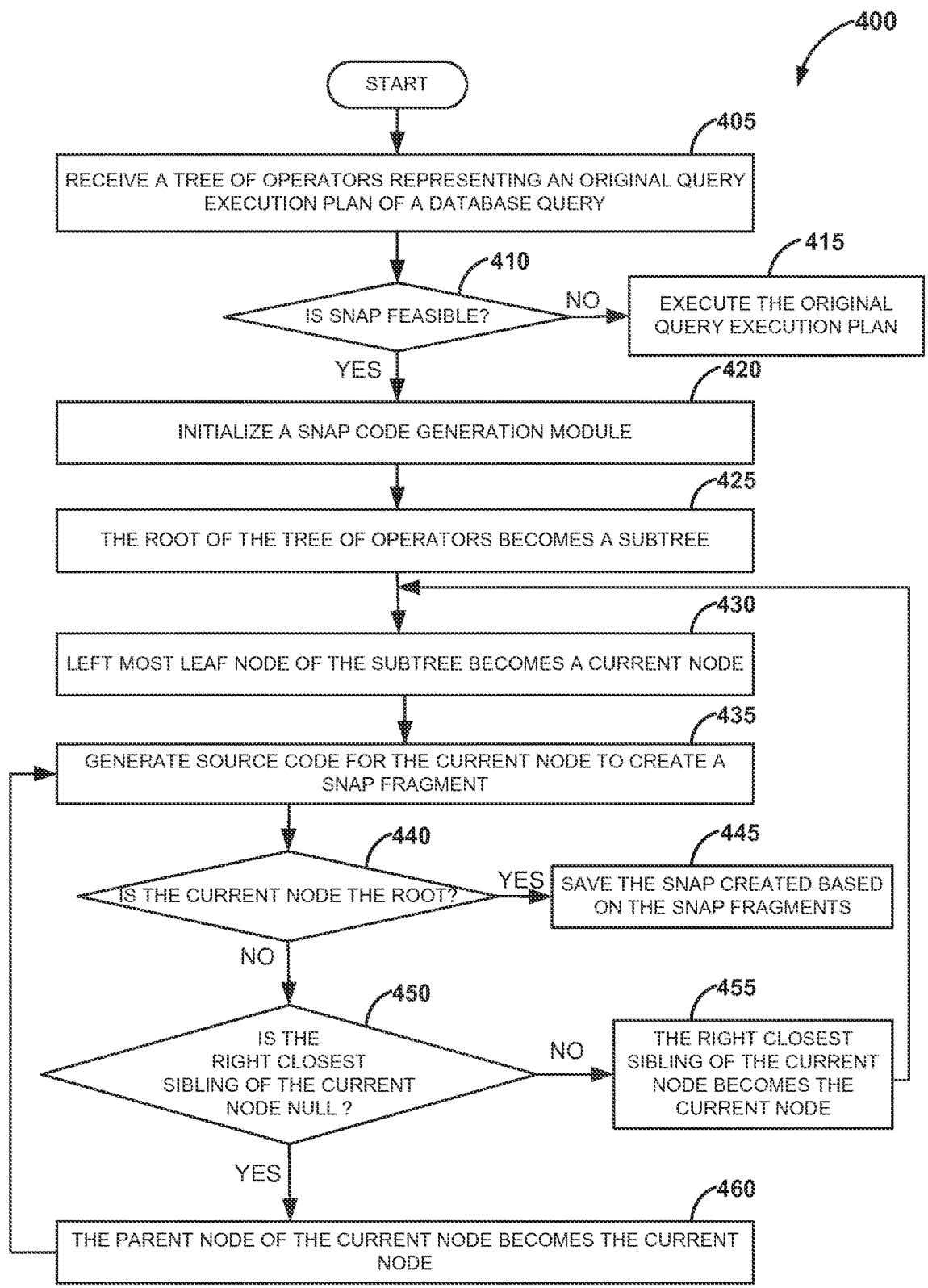
FIG. 4 illustrates a process to generate source code for each node of a tree of operators by traversing the tree of operators of an original query execution plan, according to one embodiment.

FIG. 4 illustrates a process 400 to generate source code for each node of a tree of operators by traversing the tree of operators of an original query execution plan, according to one embodiment. At 405, a tree of operators for a database query is received. The tree of operators represents an original execution plan. In one embodiment, when a client process sends a database query to a database server system, a parsing engine at the database server system parses the received database query and generates the tree of operators. At 410, it is checked whether a SNAP is feasible. A SNAP may be feasible when the database server system is configured to allow SNAP and when operators included in the query execution plan are supported. When a process to generate a SNAP is not available, at 415, the original query execution plan is executed. Alternatively, when a SNAP is feasible, at 420, a SNAP code generation module is initialized. Initialization of the SNAP generation module is further described in the context of FIG. 5. At 425, the root node of the tree of operators becomes a subtree. At 430, the left most leaf node of the subtree becomes a current node. Thus, the source code is to be generated from bottom up to the root. At 435, the source code for the current node is generated to create a SNAP fragment based on the original query execution plan.

At 440, it is checked whether the current node is the root node. If the current node is the root node, then the process has reached the root from the leaf nodes and the complete tree of operators has been traversed. In such case, the created SNAP fragments are merged into single SNAP. At 445, the SNAP created based on the SNAP fragments is saved for later execution. If the current node is not the root node, then the tree of operators has not yet been completely traversed. Then, at 450, it is checked whether the right closest sibling of the current node is null. If there is no right closest sibling then the right closest sibling of the current node would be null. If the right closest sibling of the current node is not null, at 455, the right closest sibling of the current node becomes the current node. Next, process 400 returns to 430 and makes the left most leaf node of the subtree a current node. If the right closest sibling of the current node is null, at 460, the parent node of the current node becomes the current node and the process 400 generates the source code for the current node at 435. In one embodiment, upon receiving a Lava tree, process 400 generates LLVM IR code from bottom up to the root.

The traversal of the tree of operators is performed at the database server system. The source code generation for the SNAP is performed at the compilation framework. For example, while traversing tree of operators at the ASE database server, memory space is allocated from memory space of the original query execution plan instead of runtime space. The memory space is allocated to keep data specific to each operator. Data kept includes, but is not limited to, immutable data that will not change during the lifetime of the query and mutable data that may change for every execution of the database query. The operator specific data is to be kept in the allocated memory space in a new data structure that includes mutable and immutable data. Information from the class of the operator itself, cloned context and run-time context is retrieved and filled in to the new data structure.

Table 1 illustrates the data structure that is used to describe a generated function during source code generation.

TABLE 1

```
typedef struct FunBlocks
{
    BasicBlock*    EntryBB;
    BasicBlock*    ReEntryBB;
    BasicBlock*    NeedLoopBB;
    BasicBlock*    ExitBB;
    Value*         NextVar; // −1(<0): No this fun, 0: No row, > 0: Has
                            row
    AllocaInst*    RetnCode; // 0: LRET_SUCCESS, 1:
                            LRET_ENDOFSCAN, ...
} FUNBLOCKS;
```

In one embodiment, the structure "FUNBLOCKS" may be used to represent the generated IR code that may spread over several "BasicBlocks" for one Lava operator function such as "_LeOpOpen", "_LeOpNext" or "_LeOpClose". The generated IR code represented by one instance of the structure "FUNBLOCKS" is equivalent to one Lava operator function logically. However, no LLVM function is created to wrap these BasicBlocks on which the generated IR code resides. Logically an instance of the structure "FUNBLOCKS" correspond to an LLVM logic despite that an actual function is not created. Therefore, in one embodiment, the instance of the structure "FUNBLOCKS" may be referred to as logic function in this document for simplicity.

One logic function may contain one or more LLVM "BasicBlocks". "BasicBlock EntryBB" of "FUNBLOCKS" is the entry LLVM block of a function such as "scannext". When calling the function represented by this FUNBLOCKS, the calling function creates a LLVM branch instruction to 'jump' to this EntryBB block. ExitBB is the exit block of a function. When exiting from this function, the calling function adds a LLVM branch instruction at the end of block ExitBB and 'jump' back to a calling function's block. LLVM value "NextVar" is the return value of the function represented by the "FUNBLOCKS" structure. In one embodiment, the "NextVar" value is a database server function return value. For example, return value of "getnext( )". The "NextVar" may be used to determine whether the current function returns a meaningful value or it just finished without any return value. When a function contains a loop and exit, and the function need to be reentered, the "ReEntryBB" defines the reentry basic block.

In one embodiment, the following vectors are defined to store the generated LLVM function blocks:
typedef vector<FUNBLOCKS*>OneOpFunBlocks;
typedef vector<OneOpFunBlocks*>AllOpFunBlocks;

Vector "OneOpFunBlocks" may represent a Lava operator, according to one embodiment. One entry of vector "OneOpFunBlocks" contains three functions: open, next and close. Therefore, the entry may contain one or more LLVM "BasicBlocks". Each function is described by an instance of the structure "FUNBLOCKS". Vector "AllOpFunBlocks" contains all functions that may be useful for the generation of the next (parent) operator, Vector "AllOpFunBlocks" operates like a stack in that the latest functions are put at the end of the vector (e.g., right side). When the parent needs to access its child operator's functions, the functions of the child operator can be located since the parent operator keeps the number of children it has. After finishing generating all parent functions (e.g., open, next and close), the functions of its children can be removed from the vector "AllOpFunBlocks".

Figure 5:
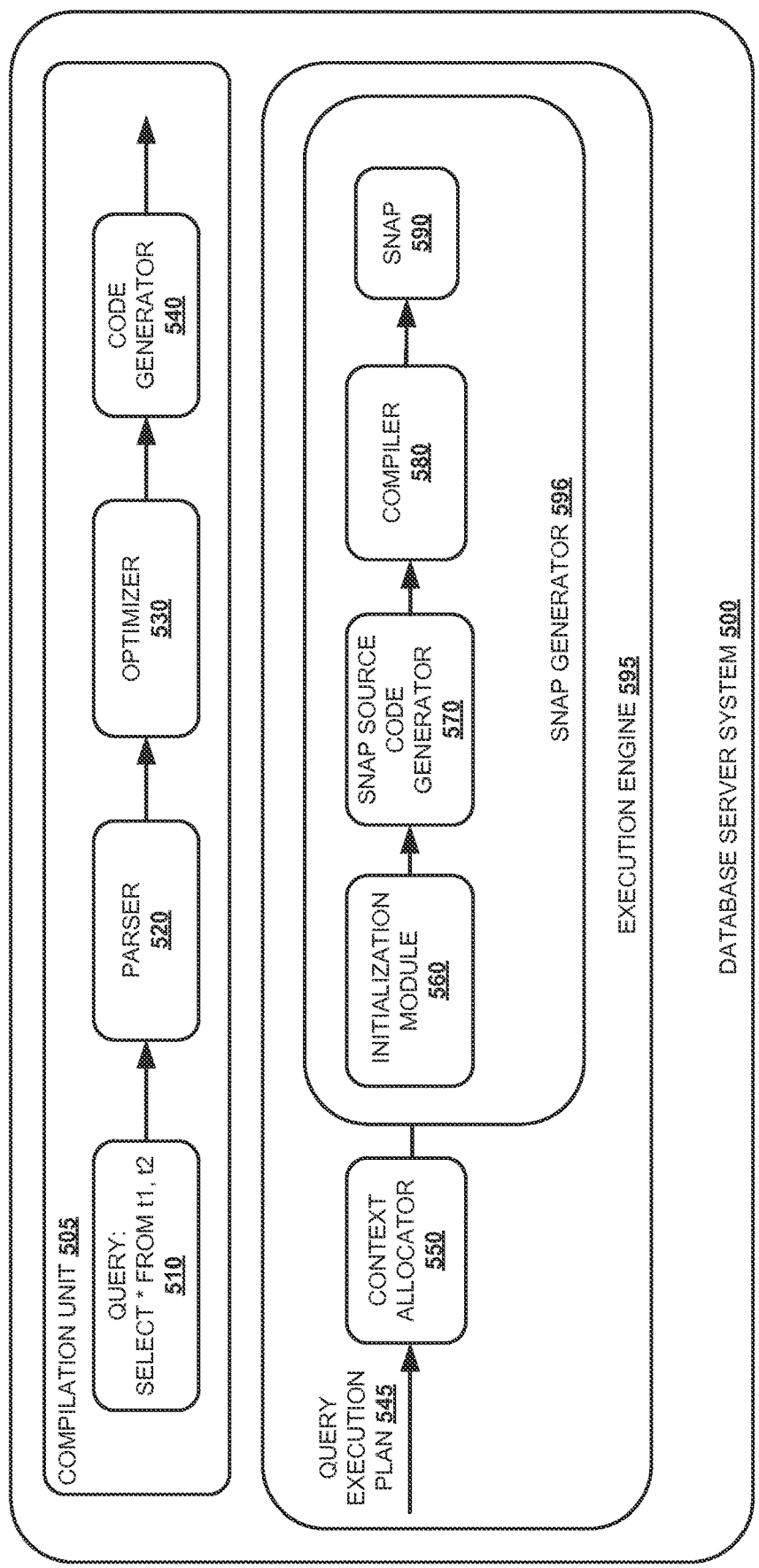
FIG. 5 illustrates a parsing engine and execution engine of a database server system to generate a SNAP for an original query execution plan, according to one embodiment.

FIG. 5 illustrates a compilation unit 505 and execution engine 595 of a database server system 500 to generate a SNAP for an original query execution plan, according to one embodiment. Compilation unit 505 includes at least parser 520, optimizer 530, and code generator 540. When a query 510 is received at compilation unit 505, parser 520 parses the query 510 and converts the text of the query statement into an internal representation. For example, query 510 is converted into a query tree. Once query 510 is converted to the internal representation, optimizer 530 analyses various possible combinations of operations to execute the query 510 and selects an efficient one. Code generator 540 converts the output of parser 520 and optimizer 530 into a form that the execution engine can process. For example, code generator 540 converts the output into a query execution plan 545. Compilation unit 505 process query 510 through the compilation phase to produce the query execution plan 545. Once compiled into query execution plan 545, execution engine 595 executes query 510 according to query execution plan 545. Context allocator 550 allocates execution context for query execution plan 545. Snap generator 596 receives as input query execution plan 545, with allocated execution context, and outputs a native machine code, i.e., a SNAP based on the original query execution plan 545. Initialization module 560 performs initialization for SNAP source code generator 570. For example, initialization module 560 may create a LLVM module where to place the SNAP and generates function signature for the SNAP. Initialization module 560 may then create LLVM basic blocks that serve as containers for the SNAP to be generated. Initialization module 560 may also create LLVM types and constants that are to be used during generation of the source code.

SNAP source code generator 570 receives a tree of operators that represents the query execution plan 545 and produces source code for the SNAP. In one embodiment, SNAP source code generator 570 produces LLVM IR code. SNAP source code generator 570 traverses the tree from root node and generates source code bottom-up. For each operator represented by a node from the tree, SNAP source code generator 570 first generates the source code for the child of the operator and then generates the source code for the operator itself. After the source code is generated, it is then compiled to native binary or machine code. The generated native machine code represents the SNAP 590. Compiler 580 is configurable with different optimization passes. In one embodiment, compiler 580 may be LLVM MCJIT (Machine Code Just in Time). After the source code is compiled into native machine code, the native machine code is then executed producing query results. After execution, the SNAP 590 is saved in a cache for subsequent execution.

In one embodiment, when the LLVM compilation framework is used to compile the generated source code, a new code generation class "SnapLLVMImpl" may be implemented to generate LLVM source code for the query plan, compile and optimize the LLVM source code into native binary code and save and run the native binary compiled plan for subsequent execution of the same query.

In one embodiment, when the execution engine 595 is a Lava execution engine, the tree of operators is a Lava tree of operators. In such case, a new member function, "LeOpProduce( )", that is responsible for traversing a Lava execution tree of operators may be implemented for every Lava operator. Similar to the "_LeOpNext( )" function in Lava execution engine, first the function "_LeOpProduce( )" of root Lava operator is called. Inside every "_LeOpProduce( )" function, the "_LeOpProduce( )" function is called of the child operator to generate LLVM IR code which covers, e.g., the "_LeOpNext( )" function of the child operator. Then a code generation class member function "PlanFragGenOp( )" may be called for the current Lava operator itself to generate LLVM code for this Lava operator.

Before traversing the Lava operator tree, "SnapLLVMImpl" initializes SNAP source code generator 570 by creating a LLVM module, where to place the final function of the SNAP. Further, necessary LLVM blocks are created as place holders for the LLVM IR, code to be generated. Necessary LLVM structures that are the mirrors of the corresponding database structures may also be created. The LLVM functions are used during the source code generation. Further, external database functions are declared or created. For example, function "getnext( )" that will be used in the following code generation may be created.

Currently initializations of the common structures, variables, functions, etc., may have been done in method "SnapLLVMImpl::Init( )". The initializations for a specific operator have been done in operator specific initialization method only when this operator appears in the query execution plan. This strategy avoids unnecessary initializations for a specific query execution plan and most of the initialization code will be distributed to initialization functions of specific operators.

During initialization, the LLVM itself may be initialized, according to one embodiment. LLVM constants such as "_const_int32_0" that will be used frequently in code generation may be created. During code generation the created constants can be used directly instead of being generated each time when needed. Further, variables may be pre-retrieved and stored in an "LLVMGen" class. During LLVM code generation, the variables can be accessed directly. For example, "_ptr_PrivData" can be retrieved from "EXECTXT" and stored. LLVM "StructType" that corresponds to database structures may be created and declared and structural elements may be defined if needed. Not all elements may need to be defined. Only the elements to be used during code generation may be defined. When defining the elements, only the relative position of the elements may be defined for LLVM code to access it. In one embodiment, if there are too many elements in a structure and the element to be accessed is at the end part of the structure, defining too many elements may decrease the performance. In one embodiment, the element may be moved forward to the beginning of the structure in both database and LLVM code generation. In another embodiment, all unused elements may be defined inside a single Integer type (LLVM integer can be of any size) with proper size calculated by using C function offsetof( ). The defined elements in LLVM correspond to the elements as defined in ASE. If the position of an element in ASE changes, the definition of the element in the corresponding "StructType" in LLVM code generation also need to change. The benefit of using offsetof( ) is that the change between ASE side and LLVM code generation side is automatically synchronized. If the position of an element inside a structure is not moved but may just be deleted from the structure, or only new element will be added into the structure, the "offsetof( )" function may be used to define the elements and get and store the relative positions or indexes of the elements and use these positions or indexes during code generation.

Further, during initialization database functions may be declared or added such that the database functions can be placed as external function calls. For example, "getnext( )" may be an external function to get next row from access layer during scan. The entry point of the code generation logic may be a member function "PlanFragGenOp( )". The function "PlanFragGenOp( )" receives different Lava operators and calls different member functions to generate the corresponding LLVM code. For each Lava operator, there may be a set of member functions in the class "SnapLLVMImpl" to generate all functionalities of the Lava operator. Thus, in one aspect, the functionalities of the Lava operator are rewritten such that the new functions as well as the whole SNAP operates in a producer driven instead of consumer drive model.

For query execution plan 545, SNAP source code generator 570 generates code in the bottom-up post-order fashion, according to one embodiment. For example, for a Nested Loop Join (NLJ), SNAP source code generator 570 first generates code for left child (e.g., a scan operator), then right child (e.g., a scan operator) and finally parent (e.g., a NLJ operator). For each operator, SNAP source code generator 570 first generates LLVM code for all the children. In other words, SNAP source code generator 570 first generates LLVM code for the producer. Then it creates LLVM code for the current operator by calling or consuming corresponding child LLVM function code, which actually generates the LLVM code of current operator as a producer for its parent operator. This procedure continues until generating code for all operators. In this model, producer and consumer roles are not separated. For a single LLVM code generation function, "_LeOpProduce( )", the function is a producer to the parent operator and at the same time is a consumer to the child operator. Since in this code generation procedure first generated is the LLVM code for child operators that are producers in a query plan, it is called a producer-driven model of SNAP code generation. One advantage is that new algorithms to separate producer and consumer logic for generating LLVM code for an operator need not be designed. Therefore, the developing risk may be reduced.

In the implementation after generating LLVM code for all the child operators of an operator, SNAP source code generator 570 calls "SnapLLVMImpl::PlanFragGenOp( )" with its own "OpCode" and other necessary information and transfers the control to compiler 580 where the different member functions of class "SnapLLVMImpl" are called according to "OpCode" to generate all the functionalities of the current operator. In one embodiment, compiler 580 generates LLVM functions consisting of a set of blocks for the five Lava operator functions "_LeOpAcquire( )", "_LeOpOpen( )", "_LeOpNex( )", "_LeOpClose(")" and "_LeOpRelease( )". Among those five functions in a Lava operator, "_LeOpAcquire( )" is called at the beginning of the query execution and "_LeOpRelease( )" is called at the end of the query execution. This means that in the whole generated LLVM code, the positions where theses function will be called are known when generating LLVM code for them. Therefore, these functions can be placed at the proper position in the generated code and it is not needed to store them somewhere for future use. However, although the positions of functions "_LeOpOpen( )" and "_LeOpClose( )" in the whole generated LLVM code of the query execution plan 545 for some query execution plans may be clear, for other it may be a challenge to determine the positions of "_LeOpOpen( )" and "_LeOpClose( )".

Figure 6:
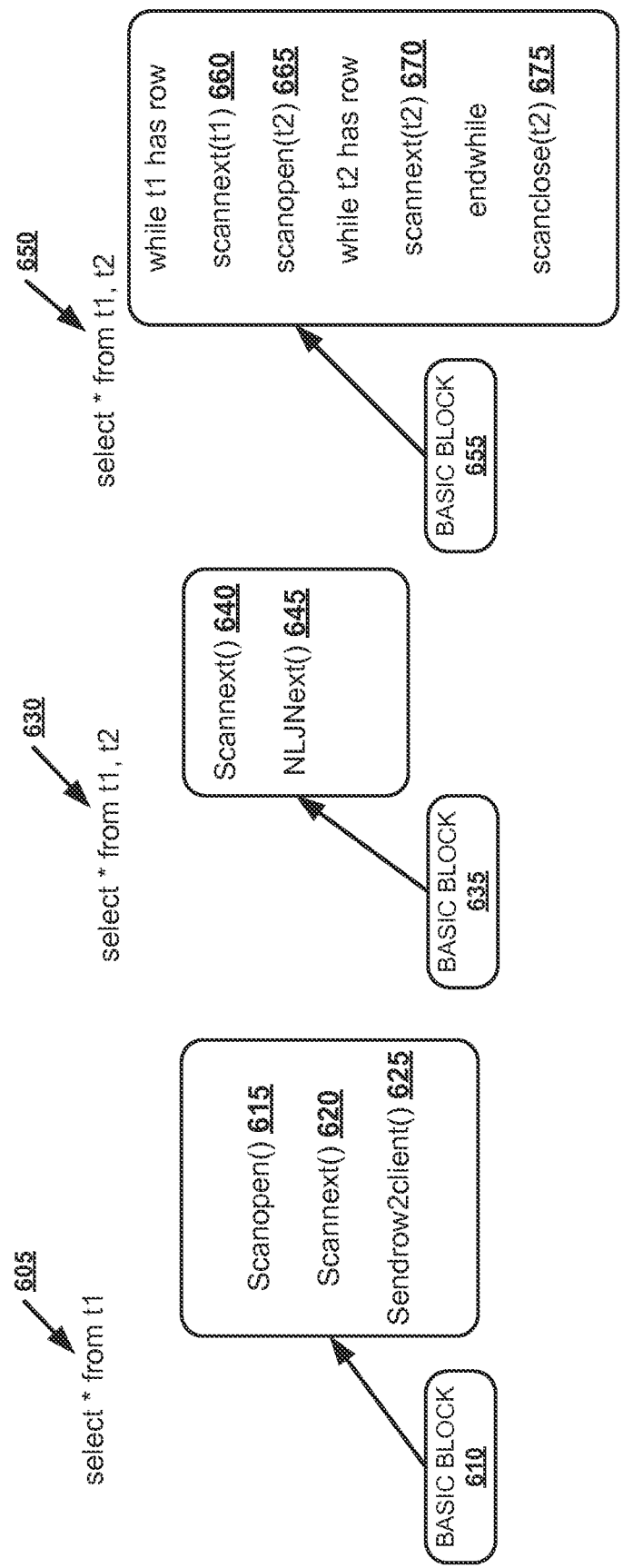
FIGS. 6A-C illustrate positions of generated source code of functions of an operator in a SNAP, according to one embodiment.

FIG. 6A illustrates positions of functions "scanopen( )" 615, "scannext( )" 620 and "sendrow2client( )" 625 in basic block 610. Basic block 610 corresponds to generated LLVM IR code for query 605. In the more simple query 605, it is known where to call "_LeOpOpen( )" and "_LeOpClose( )" of an Lava operator "LeScanOp" during generating code for "LeScanOp". The generated LLVM functions or instructions can be inserted at proper position of the whole SNAP plan. However, for the query 630 and 650 where nest loop join will be used in the plan, it is not known where to place the LLVM code of "_LeOpOpen( )" and "_LeOpClose( )" of "LeScanOp", because "_LeOpOpen( )" and "_LeOpClose( )" of right/inner side "LeScanOp" will be used in operator "LeNLJOp". However, the LLVM IR code for "LeNLJOperator" has not been generated yet.

If the generated LLVM IR code of a child operator in a SNAP plan is placed immediately after the point where it is generated, the generated LLVM IR code may be placed at improper positions under some circumstances. For example, FIG. 6B illustrates improper positions in basic block 635 of functions "scannext( )" 640 and "NLJnext( )" 645 for query 630. Instead of placing generated LLVM IR code immediately after it is generated, references to generated source or LLVM IR code of functions _LeOpOpen( ), _LeOpNext( ) and _LeOpClose( ) for all child operators are stored for future use into a temporary storage. During generation of the code for the parent operator, these child functions are called and placed into proper position of the SNAP.

FIG. 6C illustrates basic block 655 that includes generated LLVM IR code for query 650 containing nested loop join (NLJ), according to one embodiment. First, LLVM IR code for nljopen, nljnext and nljclose is generated and it is stored for future reference. Next, LLVM IR codes of "scanopen(t2)" 665, "scannext(t1)" 660 and 670, and "scanclose(t2)" 675 of LeScanOp are generated and stored in a vector of function blocks such as a vector "AllOpFunfflocks".

In one embodiment, generated code of child operators will only be used when generating code for the parent operator. After the code for the parent operator is generated, the generated code of the child operators is not needed any more. Thus, the referenced to the code representing the children code can be removed from the temporary storage. At this time, the code for the parent operator may become useful for generating code for the parent's parent operator. It means the parent operator becomes the child operator of its own parent and the references to the LLVM IR code of its "_LeOpOpen( )", "_LeOpNext( )" and "_LeOpClose( )" functions are stored into the temporary storage as its child did. In one embodiment, LLVM functions are not generated, but instead, basic blocks are created and needed LLVM IR code is placed into these blocks. In one embodiment, for all Lava open, next and close functions, LLVM Basic Blocks are generated inside the main SNAP function for these functions instead of the LLVM functions.

Figure 7:
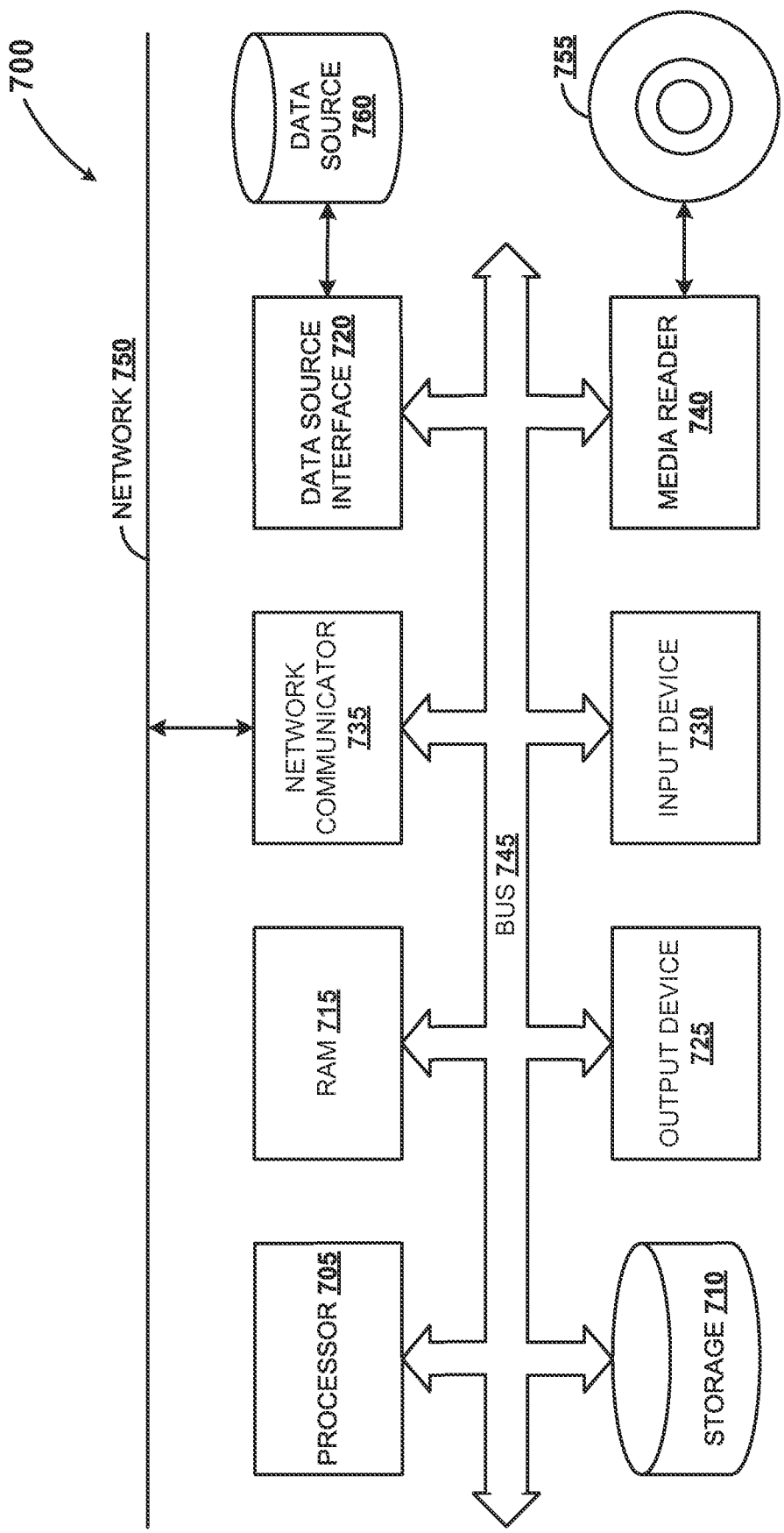
FIG. 7 illustrates an exemplary computer system, according to one embodiment.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions front the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. These output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. in other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to generate a simplified native access plan (SNAP) from an original query execution plan, the method comprising:
   receiving an original query execution plan of a database query of a database system, wherein the original query execution plan represents a tree of operators;
   determining whether the database system is configured to permit processing of the SNAP;
   wherein in response to determining that the database system is configured to permit the processing of the SNAP,
      at runtime, generating source code for the original query execution plan by a single traversal of the tree of operators;
      during generating the source code, converting a nested loop join in the original query execution plan from an iterator-based model to a single function consisting of a doubled loop;
      including in the doubled loop a function to send a respective row to a client process after the doubled loop generates each respective row;
      the single traversal traversing the tree of operators beginning at a root node and generating the source code from a bottom of the tree of operators upward; and
      at runtime, compiling the generated source code into native machine code, wherein the native machine code represents the SNAP.

2. The method of claim 1 further comprising:
   storing the SNAP for subsequent execution of the database query, wherein upon receiving a subsequent request to execute the database query, the SNAP is invoked to produce a result for the database query.

3. The method of claim 1, wherein generating the source code for the original query execution plan further comprises:
  generating source code for a child operator to produce a tuple for a parent of the child operator from the tree of operators; and
  generating source code for the parent operator to consume the produced tuple of the child operator from the tree of operators.

4. The method of claim 1, wherein the single traversal of the tree of operators further comprises:
  traversing the tree of operators from leaf nodes of the tree of operators to the root node of the tree of operators.

5. The method of claim 1 further comprising:
  initializing a SNAP code generator by generating a vector structure that includes a plurality of function blocks each representing a corresponding operator from the tree of operators, wherein each function block includes one or more basic block each representing a function of the corresponding operator.

6. The method of claim 1, wherein execution flow of the original query execution plan is consumer driven and execution flow of the SNAP is transformed to be producer driven.

7. The method of claim 1, wherein compiling the generated source code into the SNAP is performed by a low level virtual machine (LLVM) compilation framework.

8. A computer system configured to generate a simplified native access plan from an original query execution plan (SNAP), the computer system including:
  a memory to store computer executable instructions;
  at least one computer processor coupled to the memory to execute the instructions, to perform operations comprising:
    receiving an original query execution plan of a database query of a database system, wherein the original query execution plan represents a tree of operators;
    determining whether the database system is configured to permit processing of the SNAP;
    wherein in response to determining that the database system is configured to permit the processing of the SNAP,
      at runtime, generating source code for the original query execution plan by a single traversal of the tree of operators;
      during generating the source code, converting a nested loop join in the original query execution plan from an iterator-based model to a single function consisting of a doubled loop;
      including in the doubled loop a function to send a respective row to a client process after the doubled loop generates each respective row;
      the single traversal traversing the tree of operators beginning at a root node and generating the source code from a bottom of the tree of operators upward; and
      at runtime, compiling the generated source code into native machine code, wherein the native machine code represents the SNAP.

9. The computer of claim 8, wherein the operations further comprise:
  storing the SNAP for subsequent execution of the database query, wherein upon receiving a subsequent request to execute the database query, the SNAP is invoked to produce a result for the database query.

10. The computer of claim 8, wherein the operations further comprise:
  generating source code for a child operator to produce a tuple for a parent of the child operator from the tree of operators; and
  generating source code for the parent operator to consume the produced tuple of the child operator from the tree of operators.

11. The computer system of claim 8 wherein the operations further comprise:
  traversing the tree of operators from leaf nodes of the tree of operators to the root node of the tree of operators.

12. The computer system of claim 8, wherein the operations further comprise:
  initializing a SNAP code generator by generating a vector structure that includes a plurality of function blocks each representing a corresponding operator from the tree of operators, wherein each function block includes one or more basic block each representing a function of the corresponding operator.

13. The computer system of claim 8, wherein the first component configured to be run in a first runtime and the second component configured to be run in a second runtime separate from the first runtime.

14. The computer system of claim 8, wherein execution flow of the original query execution plan is consumer driven and execution flow of the SNAP is transformed to be producer driven.

15. A non-transitory computer readable medium storing instructions thereon, which when executed by a processor cause a computer system to:
  receive an original query execution plan of a database query of a database system, wherein the original query execution plan represents a tree of operators;
  determine whether the database system is configured to permit processing of a simplified native access plan (SNAP);
  wherein in response to determining that the database system is configured to permit the processing of the SNAP,
    at runtime, generate source code for the original query execution plan by a single traversal of the tree of operators;
    during generating the source code, convert a nested loop join in the original query execution plan from an iterator-based model to a single function consisting of a doubled loop;
    including in the doubled loop a function to send a respective row to a client process after the doubled loop generates each respective row;
    the single traversal traversing the tree of operators beginning at a root node and generating the source code from a bottom of the tree of operators upward; and
    at runtime, compile the generated source code into native machine code, the native machine code represents a SNAP.

16. The computer readable medium of claim 15, wherein the instructions when executed by the processor cause the computer system further to:
  storing the SNAP for subsequent execution of the database query, wherein upon receiving a subsequent request to execute the database query, the SNAP is invoked to produce a result for the database query.

17. The computer readable medium of claim 15, wherein the instructions when executed by the processor cause the computer system further to:
  generating source code for a child operator to produce a tuple for a parent of the child operator from the tree of operators; and generating source code for the parent operator to consume the produced tuple of the child operator from the tree of operators.

18. The computer readable medium of claim 15, wherein the instructions when executed by the processor cause the computer system further to:
  traversing the tree of operators from leaf nodes of the tree of operators to the root node of the tree of operators.

19. The computer readable medium of claim 15, wherein the instructions when executed by the processor cause the computer system further to:
  initializing a SNAP code generator by generating a vector structure that includes a plurality of function blocks each representing a corresponding operator from the tree of operators, wherein each function block includes one or more basic block each representing a function of the corresponding operator.

20. The computer readable medium of claim 15, wherein execution flow of the original query execution plan is consumer driven and execution flow of the SNAP is transformed to be producer driven.

* * * * *